(12) United States Patent
Mitchell et al.

(10) Patent No.: US 8,780,179 B2
(45) Date of Patent: Jul. 15, 2014

(54) ROBOT VISION WITH THREE DIMENSIONAL THERMAL IMAGING

(75) Inventors: Joseph N. Mitchell, San Antonio, TX (US); Andrew R. Moore, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 319 days.

(21) Appl. No.: 13/104,267

(22) Filed: May 10, 2011

(65) Prior Publication Data

US 2012/0287239 A1 Nov. 15, 2012

(51) Int. Cl.
*H04N 13/02* (2006.01)
*G03B 35/08* (2006.01)
*B25J 9/16* (2006.01)
*G01J 5/08* (2006.01)
*G01J 5/00* (2006.01)

(52) U.S. Cl.
CPC .............. *H04N 13/02* (2013.01); *G03B 35/08* (2013.01); *G05B 2219/37567* (2013.01); *H04N 13/021* (2013.01); *G01J 5/0809* (2013.01); *B25J 9/1697* (2013.01); *H04N 13/0217* (2013.01); *G01J 2005/0077* (2013.01); *G05B 2219/37426* (2013.01)
USPC .......................................................... 348/46

(58) Field of Classification Search
CPC ... H04N 13/02; H04N 13/021; H04N 13/027; H04N 13/0214; H04N 13/0217
USPC .......................................................... 348/46
See application file for complete search history.

(56) References Cited

U.S. PATENT DOCUMENTS

| | | | | | |
|---|---|---|---|---|---|
| 4,281,341 | A | * | 7/1981 | Byatt | 348/57 |
| 5,760,827 | A | * | 6/1998 | Faris | 348/42 |
| 2001/0015751 | A1 | * | 8/2001 | Geng | 348/36 |
| 2007/0188603 | A1 | * | 8/2007 | Riederer et al. | 348/54 |
| 2008/0024594 | A1 | * | 1/2008 | Ritchey | 348/36 |
| 2009/0037033 | A1 | * | 2/2009 | Phillips et al. | 701/2 |
| 2010/0013910 | A1 | * | 1/2010 | Farr | 348/51 |
| 2010/0322479 | A1 | * | 12/2010 | Cleveland | 348/47 |
| 2012/0154549 | A1 | * | 6/2012 | An | 348/49 |

* cited by examiner

*Primary Examiner* — Jay Patel
*Assistant Examiner* — Francis G Geroleo
(74) *Attorney, Agent, or Firm* — Chowdhury & Georgakis P.C.; Ann C. Livingston

(57) ABSTRACT

A robot vision system provides images to a remote robot viewing station, using a single long wave infrared camera on-board the robot. An optical system, also on-board the robot, has mirrors that divide the camera's field of view so that the camera receives a stereoscopic image pair. An image processing unit at the viewing station receives image data from the camera and processes the image data to provide a stereoscopic image.

7 Claims, 2 Drawing Sheets

ROBOT VISION WITH THREE DIMENSIONAL THERMAL IMAGING

TECHNICAL FIELD OF THE INVENTION

This invention relates to robot vision, and more particularly to using thermal imaging to provide three dimensional robot vision.

BACKGROUND OF THE INVENTION

With the rising use of robots for various applications, the need exists for improved robot vision technology. Robot vision enables robots to be operated under a wide range of conditions and to have information that maximizes situational awareness. Robot vision is important for accurate and fast navigation through complex terrains, for better interpretation of the robot's surroundings, for rapid recognition of objects of interest, and for improved ability to interact with objects with manipulators or by other means.

For robot vision, a combination of cameras or other image detection equipment and vision algorithms are used. Robot vision systems can range from a simple guidance application to a more complex application that uses data from multiple sensors.

A common implementation of robot vision uses a single visible light video camera. Typically, a monoscopic image is displayed on a monitor viewed by the robot operator. There are a number of limitations to this approach. Because the video is monoscopic, it does not provide depth or shape information other than what can be gleaned for the relative position of objects in the image. Also, the quality of visible and near-infrared video varies significantly depending on illumination levels and direction. High sensitivity image intensifiers can improve video quality under low light conditions, but become saturated if an illumination source enters the field of view and may not even work in full sunlight. Onboard light sources can compensate for low lighting, but require more power, have limited range, and would reveal the robot's location in covert operations.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a three-dimensional stereo robot vision system, which provides a robot operator with enhanced situational and positional awareness by the use of long-wave infrared (LWIR) images. The system works well under almost any lighting condition, day or night, and provides the operator with information about the robot's surroundings that could not be determined with traditional imaging systems. The system has at least one camera mounted on the robot, an optical system, a means to transmit image data to the robot operator, and a means for the operator to view three-dimensional stereo images.

Long wave infrared (LWIR) is a useful and versatile wavelength band (8-12 um) that requires no illumination, provides information about objects and terrain not available in visible and near-infrared images, and is not affected by typical light sources. However, one difficulty with using LWIR for night vision is image interpretation. Scenes and objects can appear quite dissimilar between LWIR and visible images, with radiative emission being the dominant source of the apparent differences rather than reflection or absorption. Common objects can be challenging to recognize or have an unexpectedly low contrast. An additional difficulty is that LWIR cameras tend to be of low resolution.

One thing that does not change from the visible to LWIR is the dimensional shape of objects. Adding dimensional information to the image greatly improves the ability to interpret them.

One embodiment of the invention uses two cameras on-board the robot. Two identical LWIR cameras with equivalent optical systems are placed side by side at an appropriate horizontal separation to achieve the desired stereo effect. However, as explained below, in other embodiments, the three-dimensional stereo robot vision may be achieved using only a LWIR single camera and a specially designed optical system. In all embodiments, the camera may provide still images or a stream of images, such as a video stream.

Figure 1:
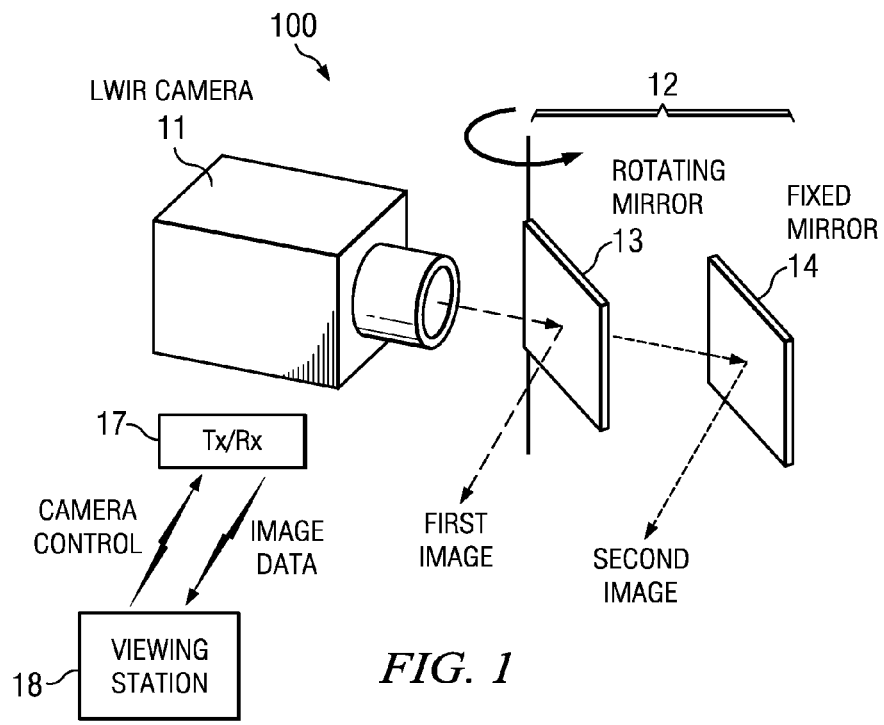
FIG. 1 illustrates one embodiment of a robot vision system.

FIG. 1 illustrates one embodiment of a robot vision system 100. Camera 11, optical system 12 and transmitter 17 are on-board the robot (not shown). Camera 11 is attached to the robot provide a desired field of view for the robot. Operating station 18 is remote from the robot, and is typically manned by a human operator who views the images acquired at the robot and controls the robot.

As explained below, system 100 provides two images (or two sets of video streams) whose fields of view are spatially separate in a horizontal plane such as are human eyes. More specifically, camera 11 and optical system provide two side-by-side images of the same scene, to be combined and displayed at the operating/viewing station 18 as a stereoscopic image.

System 100 has only a single LWIR camera 11. Camera 11 may be a commercially available (or to be developed) thermal imaging camera. These thermographic cameras operate in the LWIR region, based on uncooled bolometer arrays as well as on cooled arrays. Camera 11 may provide still and/or motion images, and may have various resolution and frame rate options.

An optical system 12 provides two spatially separated fields of view to the camera 11. Optical system 12 has an active component that is operated in synchronization with the frame rate of the camera such that only one input field of view is visible to the camera at a time. This capability may be implemented in several forms, such as with a flipping or rotating mirror, a beam splitter with a mechanical shutter, or an electro-optical material operating as an attenuator that can vary its transmittance.

In the example of FIG. 1, optical system 12 has a pair of mirrors 13 and 14, one fixed and one rotating. The rotating mirror 13 moves into the camera's field of view to provide a first image, then out of the camera's field of view so that the camera's field of view is of a second image from the fixed mirror 14.

System 100 further comprises an on-board transmitter 17, which provides a means to transmit the stereo video stream to an operator remote from the robot, as well as to receive commands from the operator to camera 11 for remote camera control. The streaming can involve transmission over an electrical cable, an optical fiber, or by wireless radio frequency transmissions. To keep data requirements low, the individual video streams may be multiplexed or interlaced.

An operating/viewing station 18 receives the video stream, and allows the operator to view the LWIR images such that the three dimensional stereo effect is visible. This can be accomplished by several means, the preferred being use of stereo viewing goggles, since this provides an immersive environment for the operator and frees the operator from other distractions. Other means for displaying three dimensional images include displays that utilize polarization or shuttered glasses, or by a conventional display that uses a bi-colored stereo anaglyph along with appropriately colored glasses. Further details pertaining to the split images and their processing are described below in connection with FIGS. 2 and 3.

Figure 2:
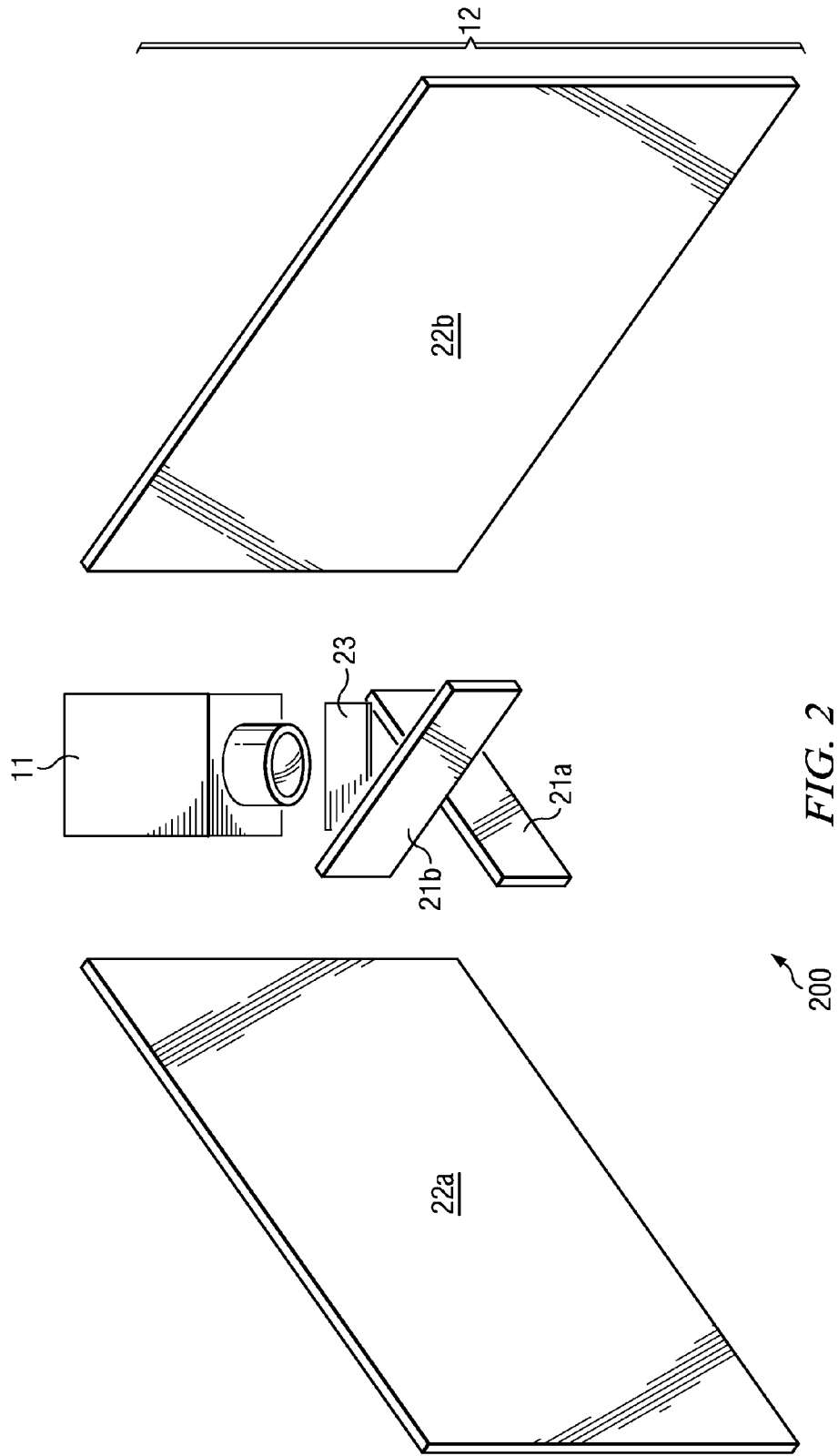
FIG. 2 illustrates a second embodiment of the camera and optical system for the robot vision system.

FIG. 2 illustrates an alternate embodiment of the optical system 12. Being a passive approach based solely on reflective components, its implementation is less expensive than the embodiment of FIG. 1. The field of view of camera 11 is split into left and right portions.

A first pair of mirrors, camera mirrors 21a and 21b, provide top and bottom separation of the camera's field of view. These mirrors 21a and 21b are placed one above the other crosswise, at a predetermined angle. In the example of FIG. 2, the mirrors are at a 45 degree angle with respect to the camera's optical axis. A baffle 23 between these mirrors extends to the lens of camera 11, and prevents crosstalk between the top and bottom halves of the image received by the camera. Baffle 23 is a thin piece of material of high emissivity, in a plane perpendicular to the plane of mirrors 21a and 21b. This plane is where mirrors 21a and 21b have a common boundary, that is, at the top of the bottom mirror 21a and the bottom of top mirror 21b.

A second pair of mirrors, input mirrors 22a and 22b, direct light from the forward direction (i.e., from the scene to be viewed by the robot) toward the camera mirrors 21a, 21b. The placement of input mirrors 22a and 22b determines the amount of stereo separation.

Figure 3:
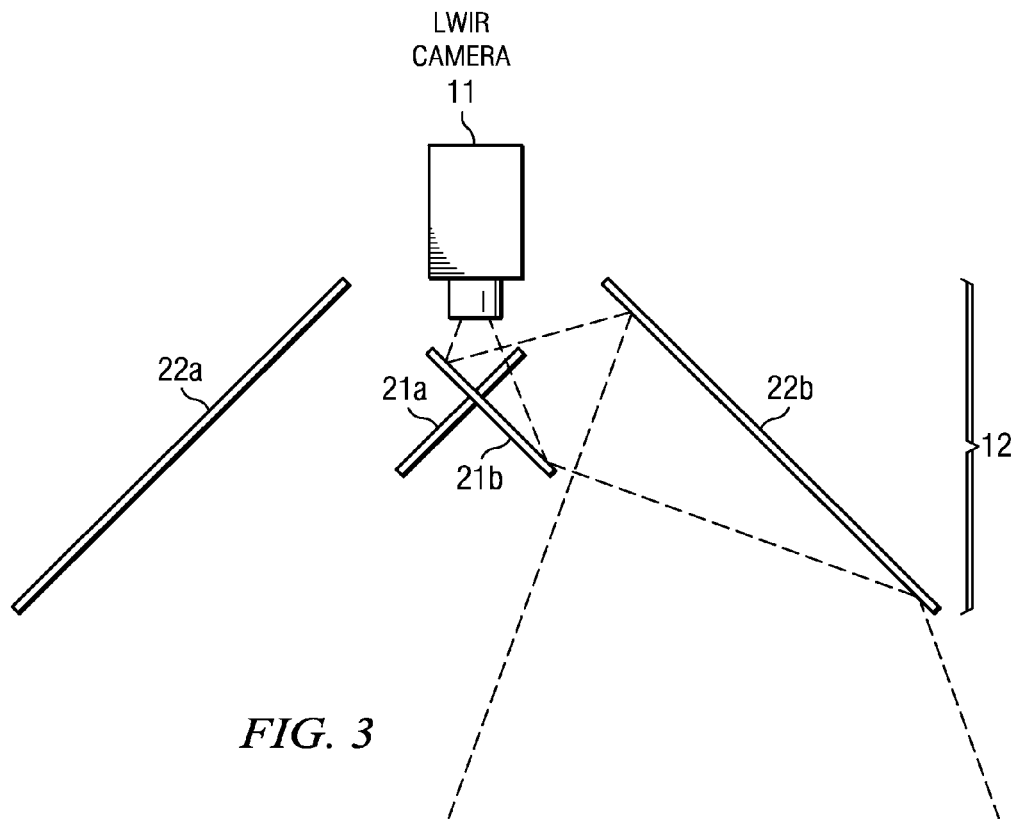
FIG. 3 illustrates the right image optical path for the system of FIG. 2.

FIG. 3 illustrates the optical path for one half of the image received by camera 11, in this view, the top half, using mirrors 21b and 22b. The optical path is shown as dashed lines.

The complete image received by camera 11 has the two fields of view split between the top and bottom halves of the frame. Although implementing a side-by-side split of the image is also possible, a top-bottom spit is more useful for a robot driving application because the most important information is in a horizontal strip just below the horizon where objects directly in front of the robot reside.

In the example of FIGS. 2 and 3, the captured images have the right view in the top half and the left view in the bottom half. Equivalently, these positions could be reversed. These images are transmitted to the viewing station 18. Referring again to FIG. 1, viewing station 18 has appropriate hardware and is a programmed with appropriate software for performing various image processing tasks. These tasks include processing the stereoscopic image pair (i.e., the right view and left view) to provide a single stereoscopic output image. Referring to both FIGS. 2 and 3, in an example implementation, camera mirrors 21a and 21b are about 1 inch by 3 inches. Due to the large field of view of the camera 11, the input mirrors 22a and 22b are rather large, about 6.5 inches by 7.5 inches. For both pairs of mirrors, a high surface finish is not required since the wavelengths are 10× longer than in the visible and the spatial resolution of thermal imaging sensors is relatively low.

Although this implementation is rather large, the size could be reduced by use of a narrower field of view lens on the camera 11 combined with narrower, long focal length convex mirrors. These mirrors would act to increase the field of view of the camera while making a slightly more compact optical system.

The above-described stereo LWIR imaging provides immersive video for a robot operator to enhance situational awareness and for improved understanding of the robot's surroundings. With stereo viewing, the shape of objects in an image is a more dominant factor than just brightness or color. Because a user will have familiar visual depth cues to focus on, object recognition is greatly improved over a single camera. The topography of the area through which the robot is navigating becomes readily apparent by use of stereo imagery allowing the operator to quickly select an optimal path. In addition, the use of stereo imaging appears to overcome some resolution limitations of the cameras since the operator has twice the amount of data to visualize their surroundings. The use of LWIR itself provides enhanced information. Different types of terrain (i.e. rocks, gavel, sand, etc.) are more readily distinguished. Objects with low visible contrast (such as plants and the ground) have high contrast in LWIR. Additionally, objects of interest to a robot operator such as people, animals, active electronics packages, voids, and disturbed ground can be distinguished by their LWIR emissions.

What is claimed is:

1. A robot vision system for providing images from a robot to a remote viewing station, comprising:
    a single long wave infrared camera on-board the robot;
    an optical system on-board the robot, and having at least a first and second camera mirror and a first and second input mirror;
    wherein the first input mirror is configured to receive a first image and to reflect the first image to the first camera mirror;
    wherein the second input mirror is configured to receive a second image and to reflect the second image to the second camera mirror;
    wherein the first input mirror and the second input mirror are forward looking and are angled such that a majority of the first image and the second image are overlapping such that the first image and the second image are a stereoscopic pair of images of a scene;
    a transmitter for transmitting image data representing the stereoscopic image pair to the viewing station; and
    an image processing unit at the viewing station, operable to receive the image data as an image frame and to process the image data to provide a stereoscopic output image;
    wherein the first camera mirror and the second camera mirror are configured to simultaneously reflect the first image and the second image, respectively, to the top half and the bottom half of the image frame or vice versa, thereby each reflecting a left or a right image;
    wherein the first camera mirror and the second camera mirror are configured crosswise in front of the camera, with one on top of the other; and
    a baffle placed in a plane perpendicular to the plane of, and between the first camera mirror and the second camera mirror, the baffle operable to prevent overlap between the left and right images as received by the camera.

2. The system of claim 1, wherein the transmitter is configured to transmit the image data wirelessly.

3. The system of claim 1, wherein the first and second camera mirrors are placed one above the other at a predetermined angle.

4. The system of claim 1, further comprising a baffle between the first and second camera mirrors, placed in a plane perpendicular to the plane of the camera mirrors.

5. The system of claim 1, wherein the first and second input mirrors are convex mirrors.

6. The system of claim 1, wherein the transmitter is configured to transmit the stereoscopic image pair as multiplexed or interlaced images.

7. A method of providing images from a robot to a remote viewing station, comprising:
- placing a single long wave infrared camera on-board the robot;
- placing an optical system on-board the robot, the optical system having at least a first and second camera mirror and a first and a second input mirror;
- wherein the first input mirror is configured to receive a first image and to reflect the first image to the first camera mirror;
- wherein the second input mirror is configured to receive a second image and to reflect the second image to the second camera mirror;
- wherein the first input mirror and the second input mirror are forward looking and are angled such that a majority of the first image and the second image are overlapping such that the first image and the second image are a stereoscopic pair of images of a scene;
- transmitting image data representing the stereoscopic pair of images to the viewing station; and
- receiving the image data at the viewing station, the viewing station having a processor operable to receive the image data as an image frame, and to process the image data to provide a stereoscopic output image;
- wherein the first camera mirror and the second camera mirror are configured to simultaneously reflect the first image and the second image, respectively, to the top half and the bottom half of the image frame or vice versa, thereby each reflecting a left or a right image;
- wherein the first camera mirror and the second camera mirror are configured crosswise in front of the camera, with one on top of the other; and
- wherein the optical system further has a baffle placed in a plane perpendicular to the plane of, and between the first camera mirror and the second camera mirror, the baffle operable to prevent overlap between the left and right images as received by the camera.

* * * * *